(12) United States Patent
Buddendick et al.

(10) Patent No.: US 11,624,818 B2
(45) Date of Patent: Apr. 11, 2023

(54) METHOD AND DEVICE FOR CHECKING THE PLAUSIBILITY OF A TRANSVERSE MOVEMENT

(71) Applicant: Robert Bosch GmbH, Stuttgart (DE)

(72) Inventors: Hermann Buddendick, Sindelfingen (DE); Markus Schlosser, Jockgrim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 220 days.

(21) Appl. No.: 16/767,373

(22) PCT Filed: Nov. 22, 2018

(86) PCT No.: PCT/EP2018/082298
§ 371 (c)(1),
(2) Date: May 27, 2020

(87) PCT Pub. No.: WO2019/141414
PCT Pub. Date: Jul. 25, 2019

(65) Prior Publication Data
US 2020/0386881 A1    Dec. 10, 2020

(30) Foreign Application Priority Data

Jan. 18, 2018    (DE) .......................... 102018200755.1

(51) Int. Cl.
*G01S 13/58*    (2006.01)
*G01S 13/931*    (2020.01)

(52) U.S. Cl.
CPC .......... *G01S 13/589* (2013.01); *G01S 13/583* (2013.01); *G01S 13/931* (2013.01);
(Continued)

(58) Field of Classification Search
CPC ................. G01S 13/589; G01S 13/583; G01S 2013/93271; G01S 11/14; G01S 19/19;
(Continued)

(56) References Cited

U.S. PATENT DOCUMENTS 7,151,483 B2 * 12/2006 Dizaji ................... G01S 13/284
342/134
9,383,442 B2 * 7/2016 Hampikian ........... G01S 13/584
(Continued)

FOREIGN PATENT DOCUMENTS

DE    19949409 A1    4/2001
DE    102009029465 A1    4/2011
(Continued)

OTHER PUBLICATIONS

International Search Report for PCT/EP2018/082298, dated Feb. 26, 2019.
(Continued)

*Primary Examiner* — Olumide Ajibade Akonai
(74) *Attorney, Agent, or Firm* — Norton Rose Fulbright US LLP; Gerard Messina

(57) ABSTRACT

A method for checking the plausibility of an initially known transverse movement of an object. The method includes: emission of a radar signal having constant signal frequency, and reception by a radar device of reflections of the radar signal having constant signal frequency; and checking the plausibility of the transverse movement of the object by analyzing frequency ranges corresponding to the transverse movement in a spectrum of the reflected radar signal having constant signal frequency.

18 Claims, 4 Drawing Sheets

(52) U.S. Cl.
CPC ............... *G01S 2013/9318* (2020.01); *G01S 2013/93185* (2020.01); *G01S 2013/93271* (2020.01)

(58) Field of Classification Search
CPC ........ G01S 7/2883; G01S 7/356; G01S 7/354; G01S 13/58; G01S 13/04; G01S 13/56; G01S 7/536; G01S 13/9027; G01S 15/60; G01S 17/58; G01S 13/34; G01S 13/931
See application file for complete search history.

(56) References Cited

U.S. PATENT DOCUMENTS

| | | | | |
|---|---|---|---|---|
| 2009/0015462 | A1* | 1/2009 | Nakanishi | G08G 1/167 342/107 |
| 2011/0084872 | A1* | 4/2011 | Kishida | G01S 13/931 342/146 |
| 2017/0097405 | A1* | 4/2017 | Lerner | G01S 13/583 |
| 2017/0356991 | A1 | 12/2017 | Yosoku et al. | |
| 2018/0164405 | A1* | 6/2018 | Pokrass | G01S 7/288 |
| 2019/0212430 | A1* | 7/2019 | Akamine | G01S 13/87 |
| 2021/0132212 | A1* | 5/2021 | Brosche | G01S 13/58 |

FOREIGN PATENT DOCUMENTS

| | | |
|---|---|---|
| DE | 102012024998 A1 | 6/2014 |
| EP | 1460454 A2 | 9/2004 |
| EP | 2068173 A1 | 6/2009 |
| EP | 3252501 A1 | 12/2017 |
| JP | 2009041981 A | 2/2009 |
| JP | 2009192430 A | 8/2009 |
| JP | 2010257138 A | 11/2010 |

OTHER PUBLICATIONS

Florian Folster et al., "Lateral Velocity Estimation Based On Automotive Radar Sensors", Radar 2006: Proceedings of 2006 CIE International Conference on Radar, Shanghai, China, IEEE Operations Center, Piscataway, NJ, 2006, pp. 1-4. XP031073571.

Kellner Dominik et al., "Instantaneous Lateral Velocity Estimation of a Vehicle Using Doppler Radar", Proceedings of the 16th International Conference on Information Fusion, ISIF Intl Society of Information Fusi, 2013, pp. 877-884. XP032512378.

* cited by examiner

METHOD AND DEVICE FOR CHECKING THE PLAUSIBILITY OF A TRANSVERSE MOVEMENT

FIELD

The present invention relates to a method for checking the plausibility of an initially known transverse movement of an object, and to a corresponding device. The present invention relates in particular to driver assistance systems having such a device.

BACKGROUND INFORMATION

Modern driver assistance systems have radar sensors for monitoring the environment surrounding the vehicle. In contrast to video cameras, radar sensors can directly measure the relative speeds of an object, making use of the Doppler effect. An example of a method for object detection is described in German Patent Application No. DE 1994 9409 μl.

So-called FMCW (frequency modulated continuous wave) methods are in particularly wide use. In these methods, a radar signal having a periodically modulated frequency is emitted, and the radar signal reflected by an object is then received and evaluated. In addition to the relative speed, the FMCW method makes it possible to determine the distance to the object on the basis of the size of the frequency difference between the emitted radar signal and the received radar signal.

The measurement of object angles, i.e., azimuth angles of the object relative to the main direction of transmission of the radar device, is realized less accurately by radar sensors than by video cameras. The accuracy is a function in particular of the aperture of the radar sensor, and in particular of the width of the array of the receive antenna. In addition, FMCW methods have greater inaccuracy than CW methods, because the range analyzed in the Doppler spectrum is more strongly interfered with by other objects. In particular, the recognition of transverse movements, i.e., movements of the object perpendicular to the direction of movement of the radar device, or of the vehicle, are therefore frequently difficult to correctly evaluate.

SUMMARY

The present invention provides a method for checking the plausibility of an initially known transverse movement of an object, and a device for checking the plausibility of an initially known transverse movement of an object.

According to a first aspect, the present invention provides a method for checking the plausibility of an initially known transverse movement of an object. In accordance with an example embodiment of the present invention, for this purpose, a radar signal is emitted having a constant signal frequency, and reflections of the radar signal having constant signal frequency are received by a radar device. The transverse movement of the object is checked for plausibility by analyzing frequency ranges in a spectrum of the reflected radar signal having constant signal frequency, these frequency ranges corresponding to the transverse movement of the object.

According to a second aspect, the present invention provides a device for checking the plausibility of an initially known transverse movement of an object. In accordance with an example embodiment of the present invention, the device includes a radar device that emits a radar signal having constant signal frequency and receives reflections of the radar signal having constant signal frequency. A computing device is designed to check the plausibility of the transverse movement of the object by analyzing frequency ranges corresponding to the transverse movement in a spectrum of the reflected radar signal having constant signal frequency.

Preferred specific embodiments of the present invention are described herein.

The emitted radar signal is a transmission sequence having constant signal frequency, preferably characterized by a duration that significantly exceeds the duration of individual ramps of FMCW-modulated radar signals. Therefore, on the basis of the radar signal having constant signal frequency significantly higher speed resolutions can be achieved than would be possible with the use of FMCW-modulated radar signals. For example, the radar signal having constant signal frequency can have a duration of 20 ms, corresponding to a resolution in the range of approximately 0.1 m/s.

In addition to the higher speed resolution, the angular resolution is in general also more accurate. In this way, an initially known transverse movement of the object detected in some other way can be checked for plausibility, one which was determined for example on the basis of sensor data such as video data or, particularly preferably, on the basis of FMCW-modulated radar signals. In particular, critical transverse movements that represent a risk of collision can be checked for plausibility.

In the sense of the present invention, "check for plausibility" can be understood as meaning that the existence of the detected object is verified or falsified. In particular, a probability value can be calculated for the existence of the object. In addition, this can be understood as meaning that the precise movement of the object is checked. For this purpose, in particular a criticality of the object movement can be calculated, which can quantify for example a probability of a collision.

According to a preferred development of the example method according to the present invention, the transverse movement of the object is checked for plausibility if a Doppler shift that corresponds to the object is detected in the frequency range.

According to a preferred development of the example method according to the present invention, a relative speed and/or an azimuth angle of the object are calculated on the basis of the spectrum of the reflected radar signal having constant signal frequency. The checking for plausibility of the transverse movement of the object includes a comparison of the relative speed calculated on the basis of the radar signal, and/or of the azimuth angle calculated on the basis of the radar signal, with the calculated transverse movement. In addition, the transverse movement can be checked for plausibility if a Doppler shift in the frequency spectrum of the radar signal having constant signal frequency can be detected that corresponds to a relative speed, determined using the FMCW-modulated radar signals, between the object and the radar device, or a vehicle that has the radar device. In this way, according to this specific embodiment a transverse movement can include in particular a transverse speed and/or a relative speed of the object. A transversely moving object typically always has a radial component in the direction of the radar device that causes a Doppler shift. By determining this Doppler shift, the device can confirm the existence of a transversely moving object.

According to a preferred development of the example method according to the present invention, the initially known transverse movement of the object can be corrected using the transverse movement calculated on the basis of the radar signal. Because the transverse speed calculated on the basis of the radar signal having constant signal frequency is typically significantly more accurate, in this way the initially known transverse movement can be checked for plausibility, and typically can also be determined more precisely. In particular, a relative speed between the device, or the vehicle, and the object can be calculated and corrected on the basis of Doppler shifts.

According to a development of the example method, the transverse movement of the object includes a transverse speed of the object. In addition, the transverse movement can include a lateral distance of the object from a lane of a vehicle that has the radar device. The transverse speed and the lateral distance are of particular interest, because they principally influence the probability of a collision. These variables can be determined on the basis of the Doppler spectrum, and further information can also be taken into account. In particular, the radial distance of the initially known transverse movement can be taken into account.

According to a preferred development of the example method in accordance with the present invention, on the basis of the spectrum of the reflected radar signal a lateral distance of the object from a lane of the vehicle or from a trajectory of the vehicle is calculated. The checking of the plausibility of the transverse movement of the object includes a comparison of the lateral distance, calculated on the basis of the radar signal, with the calculated transverse movement of the object. In particular, the transverse movement can be calculated on the basis of sensor data, and in addition on the basis of the sensor data a lateral distance can be estimated that is compared with the lateral distance calculated on the basis of the radar data. A lateral distance is to be understood as the distance to the object measured perpendicular to the lane, or to the trajectory, of the vehicle. The closer an object is situated to the lane, the higher the probability of a collision. Through precise knowledge of the lateral distance, such situations can be recognized in good time, and in this way safety can be increased. In this way, critical and uncritical situations can be reliably distinguished in order to avoid unjustified emergency braking. Thus, according to this specific embodiment the transverse movement includes in particular a lateral distance.

According to a preferred development of the example method according to the present invention, an object angle of the object is determined on the basis of the spectrum of the reflected radar signal. The lateral distance is calculated using the calculated object angle of the object and the distance of the object calculated on the basis of the sensor data. Because, as stated above, the angular resolution of radar signals having constant signal frequency is very high, the object angle, and thus the lateral distance, can be calculated with a high degree of precision.

According to a preferred development of the example method according to the present invention, the sensor data for calculating the transverse movement include FMCW radar data. According to further specific embodiments of the present invention, the sensor data can be generated by video cameras, infrared sensors, or lidar sensors, or by any combination of these sensors.

BRIEF DESCRIPTION OF THE DRAWINGS

In all the Figures, identical or functionally identical elements and devices are provided with the same reference characters.

DETAILED DESCRIPTION OF EXAMPLE EMBODIMENTS

Figure 1:
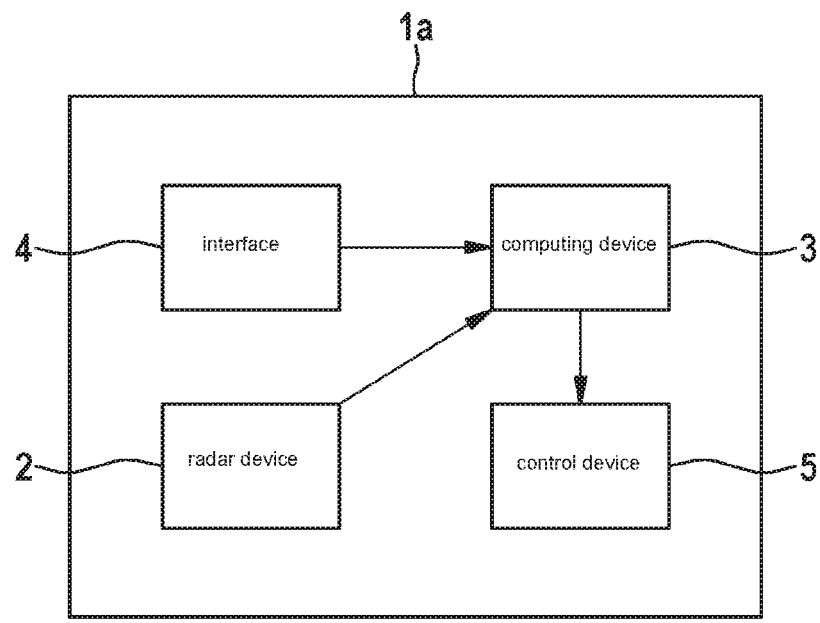
FIG. 1 shows a schematic block diagram of a device for checking the plausibility of an initially known transverse movement of an object according to a first specific embodiment of the present invention.

FIG. 1 shows a block diagram of a device 1a for checking the plausibility of an initially known transverse movement, for example calculated using sensor data, of an object in the environment of a vehicle, according to a first specific embodiment of the present invention. The object can be for example a bicyclist, a pedestrian, or another vehicle. Device 1a can be designed as a driver assistance system, or can be part of a driver assistance system of the vehicle. Device 1a includes an interface 4 that is designed to receive sensor data from sensors of the vehicle in wireless fashion or via a wired connection.

The sensor data include information concerning a transverse movement of an object in the environment of the vehicle, including in particular a transverse speed of the object and, optionally, in addition a lateral distance of the object from the lane of the vehicle. The data received via interface 4 are sent to a computing device 3 of device 1a.

Device 1a further has a radar device 2 that is situated on the vehicle and that emits and receives radar signals. For this purpose, radar device 2 emits radar signals or signal sequences having a constant signal frequency. The duration of the individual signal sequences is preferably at least 10 ms, particularly preferably at least 20 ms. Radar device 2 receives reflections of the radar signal having constant signal frequency and generates radar data that are also sent to computing device 3.

Computing device 3 includes at least one microprocessor that is designed to evaluate the data received from interface 4 and radar device 2. From the radar data, computing device 3 generates a frequency spectrum of the reflected radar signal having constant signal frequency. Computing device 3 further checks whether the relative speed of the object, calculated on the basis of the sensor data, can also be recognized in the frequency spectrum of the reflected radar signal having constant signal frequency. Computing device 3 thus checks whether, in the corresponding frequency ranges, an amplitude exceeds a specified threshold value. If this is the case, then computing device 3 recognizes that there is a corresponding Doppler shift in the radar signal. The calculated transverse speed can be checked for plausibility in this way. In particular, the existence of an actual physical transverse movement can be distinguished from migration of a reflection point. Optionally, as a function of the magnitude of the amplitude, computing device 3 can in addition indicate a plausibility variable relating to the extent to which the transverse speed can be checked for plausibility or not. The greater the amplitude, the higher the probability that an object having the radial speed or transverse speed, calculated on the basis of the sensor data, is actually present in the environment of the vehicle, because an additional check based on the radar signal having constant signal frequency is successful. The plausibility variable is correspondingly increased. Conversely, the plausibility variable can be decreased if no peaks are recognized in the corresponding frequency range.

Computing device 3 can also be designed to correct the transverse speed calculated on the basis of the sensor data. If, for example, there is a peak in the frequency spectrum of the reflected radar signal having constant signal frequency at a value close to the radial speed or transverse speed calculated on the basis of the sensor data, and the peak has an amplitude that exceeds a specified threshold value, then computing device 3 can correct the estimated value of the transverse speed in this direction.

Optionally, computing device 3 can in addition be designed to extract a lateral distance of the object from the lane from the radar data. For this purpose, radar device 2 can for example have a multiplicity of radar sensors, or one radar sensor having a multiplicity of transmit and receive antennas, so that a corresponding object angle of the object can be determined via phase differences of the received radar signal having a constant signal frequency. If the radar sensors have the same orientation, then the object angle is determined relative to the common main axis of radiation. Computing device 3 then compares the object angle extracted from the radar data with the object angle measured on the basis of the sensor data. For this purpose, computing device 3 is designed to check the plausibility of the object angle measured on the basis of the sensor data, i.e., to check whether the object angle measured on the basis of the sensor data agrees with the object angle extracted on the basis of the radar data. A corresponding plausibility variable can be adapted as a function of the result of the comparison.

According to some specific embodiments of the present invention, the angular analysis can be carried out only if the relative speed is not too low, causing the corresponding Doppler frequencies to be very small and difficult to detect. In this case in particular, a superposition with stationary objects may occur. An angular range to be investigated can be further limited on the basis of the angular range calculated using the sensor data. The position and size of the frequency interval to be analyzed is more generally adapted to the speed of movement and direction of movement of the ascertained transverse movement. The greater the absolute object speed, and the closer the direction of movement is to an exactly perpendicular direction of movement, the greater the frequency range to be analyzed is. Occlusion effects can preferably also be taken into account in the calculation of the plausibilization variable. The stronger the disturbance by other objects of the frequency interval to be analyzed around the predicted Doppler frequency, the smaller is the reduction in a probability value of the existence of a transversely crossing object on the basis of the radar signal having constant signal frequency, if no matching Doppler frequency can be found. Preferably, for this purpose the ratio is calculated between the expected receive power, which is calculated from the estimated radar cross-section and the distance to the object, and the measured interference power level.

Device 1a further includes a control device 5 that controls a driving function of the vehicle on the basis of the transverse movement, checked for plausibility, of the object. If the transverse movement of the object evaluated on the basis of the sensor data is confirmed, i.e., is also found again in the frequency spectrum of the reflected radar signal having constant signal frequency, control device 5 can introduce countermeasures if warranted in order to avoid a collision. On the basis of the transverse movement, for example a collision region and a collision time can be ascertained. Control device 5 can correspondingly steer or brake the vehicle. In particular, control device 5 can carry out an emergency braking. However, control device 5 can also be designed to output a warning signal to the driver of the vehicle.

Such a controlling of the vehicle need not necessarily be prevented if the transverse movement calculated on the basis of the sensor data cannot be checked for plausibility. If the object tracking based on the sensor data already has a very high confidence level, then, despite an absence of confirmation by the radar signal having constant signal frequency, an emergency braking can nonetheless be carried out. Such situations can occur in particular when the object is occluded by other objects.

Figure 2:
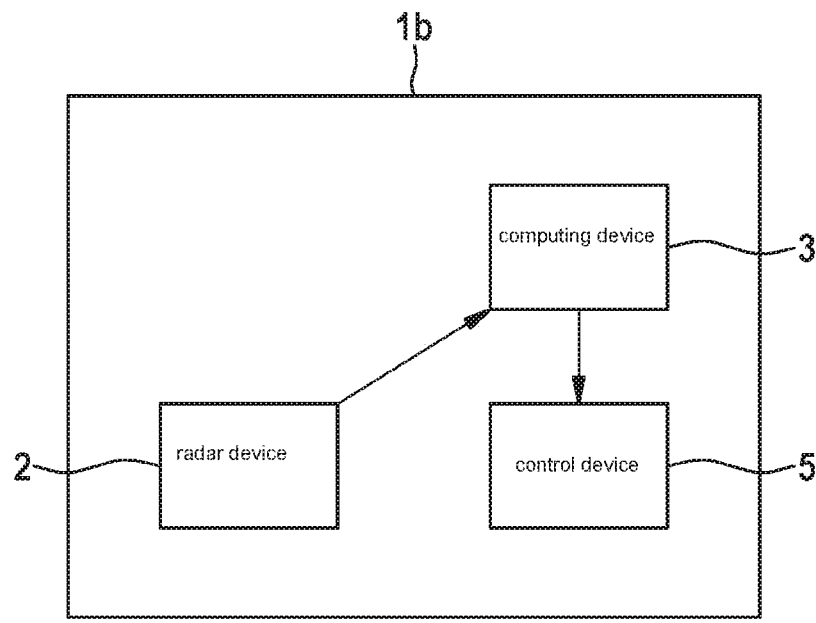
FIG. 2 shows a schematic block diagram of a device for checking the plausibility of an initially known transverse movement of an object according to a second specific embodiment of the present invention.

FIG. 2 illustrates a block diagram of a device 1b according to a second specific embodiment of the present invention. This device differs from device 1a illustrated in FIG. 1 in that the sensor data are produced by radar device 2 itself. According to this specific embodiment, radar device 2 produces temporally offset FMCW-modulated radar signals, the reflected FMCW-modulated radar signals being received and corresponding sensor data being outputted. Computing device 3 is designed to calculate a transverse movement of the object in the environment of the vehicle on the basis of the sensor data, i.e., in particular to determine a transverse speed and, preferably, in addition a lateral distance to the object.

Computing device 3 is further designed to check the plausibility of the variables of the transverse movement of the object, calculated on the basis of the sensor data. For this purpose, radar device 2 emits radar signals having constant signal frequency, temporally offset to the FMCW-modulated radar signals, and generates radar data on the basis of the received reflected radar signals having constant signal frequency. As described above, computing device 3 checks whether a corresponding relative speed is to be found in the frequency spectrum. If this is the case, then computing device 3 can in addition extract and compare the lateral distance.

In other respects, the design of device 1a corresponds to the first specific embodiment, and is therefore not described again.

Figure 3:
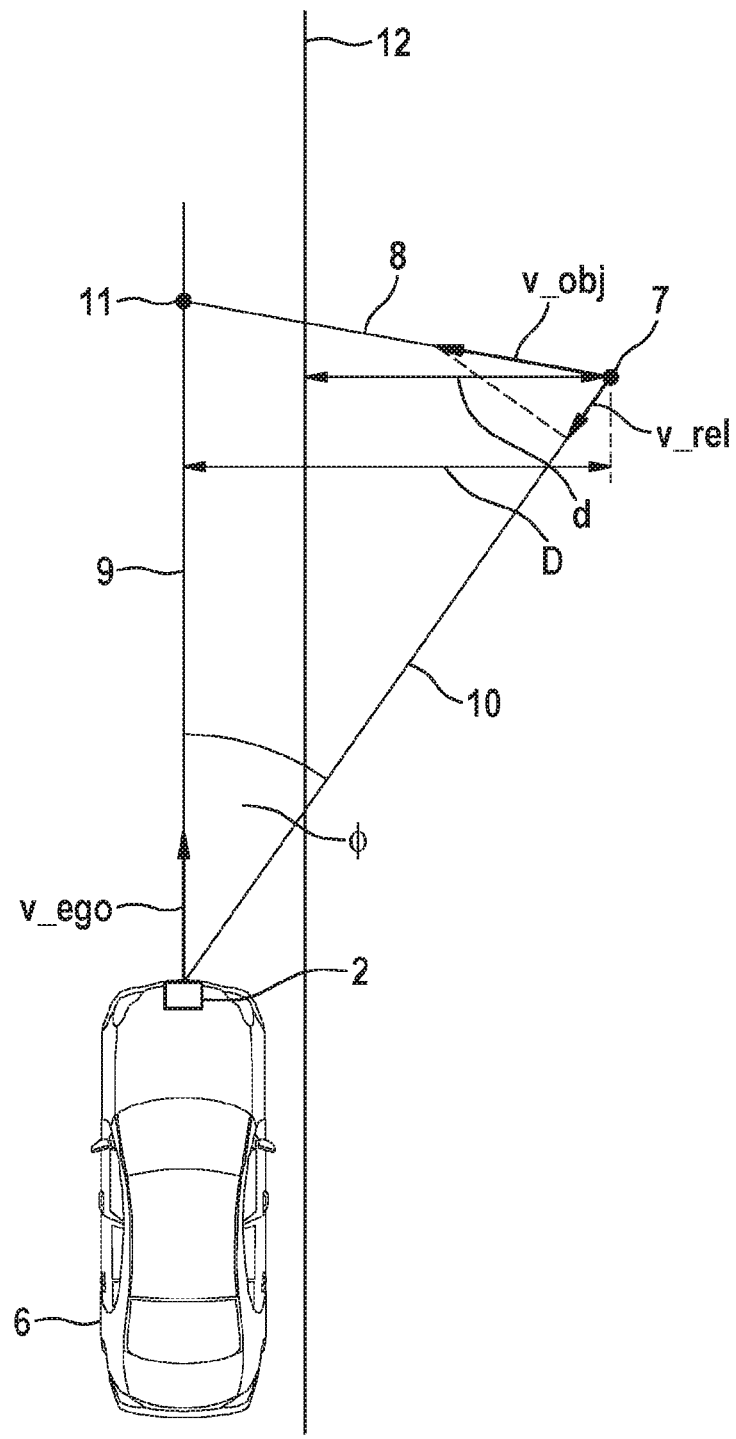
FIG. 3 shows a schematic top view of an object, as well as a vehicle having a device according to a specific embodiment of the present invention.

FIG. 3 shows an example of a scenario. Vehicle 6 has one of the above-described devices 1a, 1b. In particular, a radar device 2 is situated on the front of vehicle 6. Vehicle 6 moves along a home trajectory 9 with a home speed v_ego. On the basis of sensor data, an object 7 is recognized at an object angle ϕ that is measured relative to the direction of travel, or relative to the main direction of radiation of radar device 2. Object 7 moves with an object speed v_obj along object trajectory 8, towards a point of intersection 11 with home trajectory 9. The transverse speed of object 7 corresponds to the speed component perpendicular to the travel direction or lane. Object 7 has a radial speed v_rad in the direction of vehicle 6 that corresponds to the projection of object speed v_obj onto a connecting line 10 between radar device 2 and object 7. The relative speed of object 7 is in addition a function of the speed of vehicle 6. Object 7 has a lateral distance d from a roadway boundary 12, and has a trajectory distance D from the home trajectory of vehicle 6.

As described above, device 1a, 1b of vehicle 6 is designed to check the plausibility of the transverse movement calculated on the basis of the sensor data. For this purpose, device 1a, 1b checks on the one hand whether the existence of object 7 can be confirmed on the basis of the radar signals having constant signal frequency, and whether, if warranted, the transverse movement can be corrected. In particular, the transverse movement and/or the lateral distance of object 7 can be checked and corrected.

Figure 4:
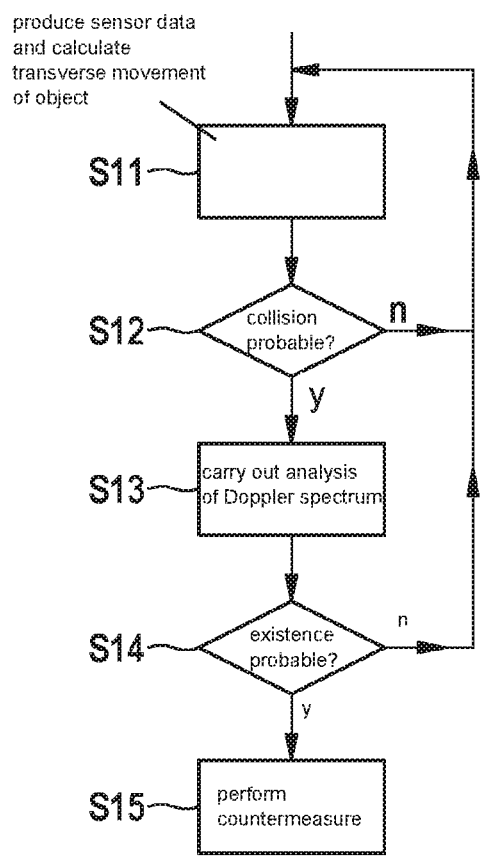
FIG. 4 shows a flow diagram of a method for checking the plausibility of a transverse movement according to a first specific embodiment of the present invention.

FIG. 4 shows a flow diagram of a method according to a specific embodiment of the present invention. For this purpose, in a method step S11 sensor data are produced and a transverse movement of an object 7 in the environment of a vehicle 6 is calculated. The sensor data are preferably generated by FMCW-modulated radar signals.

In a method step S12, on the basis of the calculated transverse movement it is checked whether a collision between vehicle 6 and object 7 is probable. If the calculated probability exceeds a specified threshold value, it is recognized that a critical transverse movement is present. In a method step S13, an analysis of the Doppler spectrum of an emitted and received radar signal having constant signal frequency is carried out. Otherwise, the next measurement cycle is analyzed (S11).

The analysis of the Doppler spectrum includes a checking of the plausibility of the transverse movement. Building on this, in a step S14 a probability of the existence of the object is ascertained, and in a method step S15 a countermeasure is introduced, for example an outputting of an acoustic, visual, or optical warning signal, a warning via a brief braking, an evasive maneuver, or an emergency braking.

According to a specific embodiment of the present invention, an emergency braking can also be carried out as soon as a corresponding Doppler frequency is found.

Figure 5:
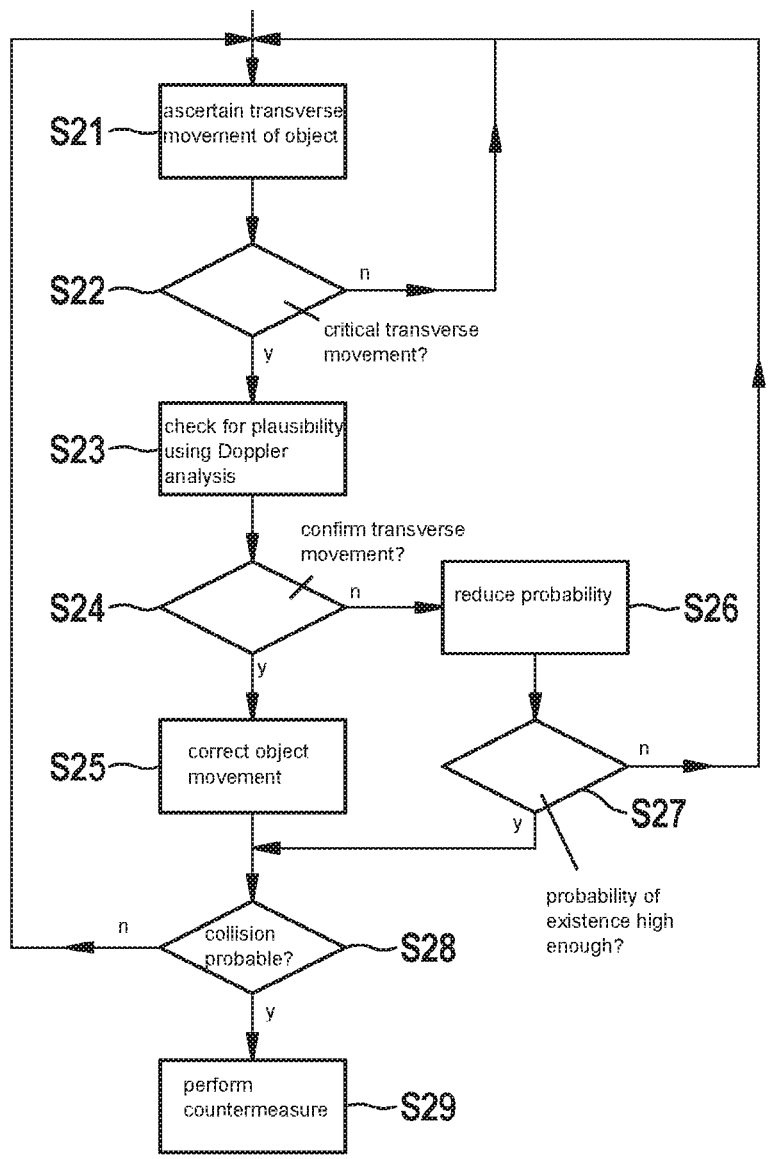
FIG. 5 shows a flow diagram of a method for checking the plausibility of a transverse movement according to a second specific embodiment of the present invention.

FIG. 5 shows a flow diagram of a method for checking the plausibility of a transverse movement of an object 7, calculated using sensor data, in the environment of a vehicle 6, according to a second specific embodiment of the present invention.

In a method step S21, the transverse movement of the object is ascertained on the basis of the sensor data in the manner described above.

In method step S22, on the basis of the sensor data it is checked whether the transverse movement is a critical transverse movement. The threshold as to whether a critical transverse movement is present can here preferably be chosen to be smaller than in step S12 of the method illustrated in FIG. 4.

Accordingly, transverse movements that are only slightly critical can also be investigated.

In a method step S23, such transverse movements are checked for plausibility as described above through analysis of the Doppler spectrum of a radar signal having constant signal frequency.

In method step S24 it is checked whether the radar signal having constant signal frequency confirms the transverse movement. If this is the case, then in a method step S25 the object movement is corrected if warranted. Otherwise, in a method step S26 the probability of the existence of the object, or the probability of a collision, is reduced. In a method step S27, it is checked whether the probability of existence is high enough. If this is not the case, the method is carried out again. Otherwise, and following method step S25, in a method step S28 it is checked whether the movement is critical enough, i.e. whether a collision is probable. If this is not the case, the method is repeated; otherwise one of the countermeasures described above is introduced (S29).

What is claimed is:

1. A method using a defined threshold value for correction or checking the plausibility of an initially known transverse movement of an object including an initially known relative speed of the object relative to a radar device, comprising the following steps:
   emitting a radar signal having a constant signal frequency;
   receiving by the radar device reflections of the radar signal having the constant signal frequency; and
   using the defined threshold value by:
      (a) checking the plausibility of the transverse movement of the object by (i) identifying which frequency range within a frequency spectrum of the reflections corresponds to an initially known relative speed and (ii) based on the identification of the frequency range, comparing a value of an amplitude that is present within the identified frequency range to the defined threshold value to determine whether the value of the amplitude is at least as high as the defined threshold value; or
      (b) (i) determining whether a peak is present, in the frequency spectrum of the reflections, at any frequency value that is within a predefined range of nearness to a frequency value that corresponds to the initially known relative speed, (ii) in response to a result of the determination being that the peak is present at the any frequency value, comparing an amplitude of the peak whose presence has been determined to the defined threshold to determine whether the value of the amplitude is at least as high as the defined threshold value, and (iii) in response to the value of the amplitude being determined to be at least as high as the defined threshold value, correcting a value of the initially known relative speed based on the peak whose presence has been determined.

2. The method as recited in claim 1, further comprising the following step:
   calculating a relative speed and/or an azimuth angle of the object based on the spectrum of the reflections of the radar signal, wherein the checking of the plausibility of the transverse movement of the object includes comparing the relative speed calculated based on the radar signal with the transverse movement, and/or comparing the azimuth angle with the transverse movement.

3. The method as recited in claim 2, further comprising the following step:
   correcting the initially known transverse movement of the object using the relative speed calculated based on the radar signal and/or using the azimuth angle calculated based on the radar signal.

4. The method as recited in claim 1, wherein the relative speed includes a transverse speed of the object.

5. The method as recited in claim 1, wherein the radar device is situated on a vehicle, and the transverse movement includes a lateral distance of the object from a lane of the vehicle.

6. The method as recited in claim 1, wherein the initially known transverse movement is calculated based on FMCW radar data.

7. The method as recited in claim 1, wherein the defined threshold value is used by the checking of the plausibility of the transverse movement of the object by (i) the identifying of which frequency range within the frequency spectrum of the reflections that corresponds to the initially known speed and (ii) based on the identification of the frequency range, the comparing of the value of the amplitude that is present within the identified frequency range to the defined threshold value to determine whether the value of the amplitude is at least as high as the first pre defined threshold value.

8. The method as recited claim 1, wherein the defined threshold value is used by (i) the determining of whether the peak is present, in the frequency spectrum of the reflections, at the any frequency value that is within the predefined range of nearness to the frequency value that corresponds to the initially known relative speed, (ii) in response to the result of the determination being that the peak is present at the any frequency value, the comparing of the amplitude of the peak whose presence has been determined to the defined threshold to determine whether the value of the amplitude is at least as high as the defined threshold value, and (iii) in response to the value of the amplitude being determined to be at least as high as the defined threshold value, the correcting of the value of the initially known relative speed based on the peak whose presence has been determined.

9. The method as recited in claim 1, wherein the radar signal having the constant signal frequency has a duration of at least 10 ms.

10. The method as recited in claim 1, wherein the radar signal having the constant signal frequency has a duration of at least 20 ms.

11. A device using a defined threshold value for correction or checking the plausibility of an initially known transverse movement of an object including an initially known relative speed of the object relative to a radar device, the device comprising:
- a radar device configured to emit a radar signal having a constant signal frequency and to receive reflections of the radar signal having the constant signal frequency; and
- a computing device configured to use the defined threshold value by:
  - (a) checking the plausibility of the transverse movement of the object by (i) identifying which frequency range within a frequency spectrum of the reflections corresponds to an initially known relative speed and (ii) based on the identification of the frequency range, comparing a value of an amplitude that is present within the identified frequency range to the defined threshold value to determine whether the value of the amplitude is at least as high as the defined threshold value; or
  - (b) (i) determining whether a peak is present, in the frequency spectrum of the reflections, at any frequency value that is within a predefined range of nearness to a frequency value that corresponds to the initially known relative speed, (ii) in response to a result of the determination being that the peak is present at the any frequency value, comparing an amplitude of the peak whose presence has been determined to the defined threshold to determine whether the value of the amplitude is at least as high as the defined threshold value, and (iii) in response to the value of the amplitude being determined to be at least as high as the defined threshold value, correcting a value of the initially known relative speed based on the peak whose presence has been determined.

12. The device as recited in claim 11, wherein the radar device is configured to emit an FMCW-modulated radar signal and to calculate the initially known transverse movement based on received reflections of the FMCW-modulated radar signal.

13. The device as recited in claim 12, wherein the radar device is configured to emit, temporally offset from one another, radar signals having the constant signal frequency and the FMCW-modulated radar signals.

14. The device as recited in claim 11, further comprising:
- a control device configured to control a driving function of a vehicle based on the transverse movement, checked for plausibility, of the object.

15. The device as recited in claim 11, wherein the defined threshold value is used by the checking of the plausibility of the transverse movement of the obj ect by (i) the identifying of which frequency range within the frequency spectrum of the reflections corresponds to the initially known speed and (ii) based on the identification of the frequency range, the comparing of the value of the amplitude that is present within the identified frequency range to the defined threshold value to determine whether the value of the amplitude is at least as high as the defined threshold value.

16. The device as recited claim 11, wherein the computing device is configured to use the defined threshold value by (i) the determining of whether the peak is present, in that the frequency spectrum of the reflections, at the any frequency value that is within the predefined range of nearness to the frequency value that corresponds to the initially known relative speed, (ii) in response to the result of the determination being that the peak is present at the any frequency value, the comparing of the amplitude of the peak whose presence has been determined to the defined threshold to determine whether the value of the amplitude is at least as high as the defined threshold value, and (iii) in response to the value of the amplitude being determined to be at least as high as the defined threshold value, the correcting of the value of the initially known relative speed based on the peak whose presence has been determined.

17. The device as recited in claim 11, wherein the radar signal having the constant signal frequency has a duration of at least 10 ms.

18. The device as recited in claim 11, wherein the radar signal having the constant signal frequency has a duration of at least 20 ms.

* * * * *